(12) United States Patent  (10) Patent No.: US 7,197,975 B2
Boll et al.                 (45) Date of Patent:     Apr. 3, 2007

(54) PISTON-CYLINDER UNIT

(75) Inventors: Gerhard Boll, Pracht (DE); Klaus Peter Klein, Asbach-Schöneberg (DE); Klaus Schmitz, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/081,423

(22) Filed: Mar. 16, 2005

(65) Prior Publication Data
US 2005/0217477 A1    Oct. 6, 2005

(30) Foreign Application Priority Data
Apr. 3, 2004   (DE) .................. 10 2004 016556

(51) Int. Cl.
*F01B 31/00* (2006.01)
(52) U.S. Cl. .................................... 92/110; 92/113
(58) Field of Classification Search ............ 92/51, 92/52, 109, 110, 113
See application file for complete search history.

(56) References Cited

U.S. PATENT DOCUMENTS

| 2,081,921 | A  | * | 6/1937  | Gartin .................. 91/45 |
| 2,789,510 | A  | * | 4/1957  | Meynig ................ 417/402 |
| 3,063,423 | A  | * | 11/1962 | Riordan ................ 92/65 |
| 6,223,649 | B1 | * | 5/2001  | Beck et al. ........... 92/109 |
| 2004/0065194 | A1 | * | 4/2004 | Varetto et al. ....... 92/109 |

* cited by examiner

*Primary Examiner*—Hoang Nguyen
(74) *Attorney, Agent, or Firm*—Cohen Pontani; Lieberman & Pavane LLP

(57) ABSTRACT

Piston-cylinder unit including a working cylinder; a piston attached to a piston rod and installed with freedom of axial displacement in the working cylinder; and fastening elements, at least one of which is screwed into a threaded bore in the piston rod, where the interior pressure in the working cylinder holds a valve in the bore of the piston rod against an end surface of the fastening element. A vent groove leading to the atmosphere is provided between the end surface and the valve to create a pressure gradient to the working space, the groove being provided between the inner surface of the piston rod and the fastening element.

6 Claims, 3 Drawing Sheets

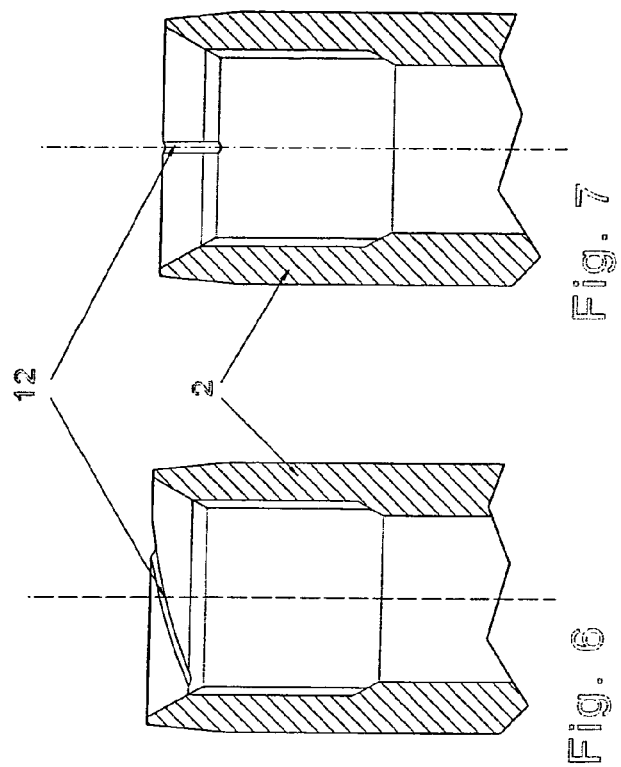
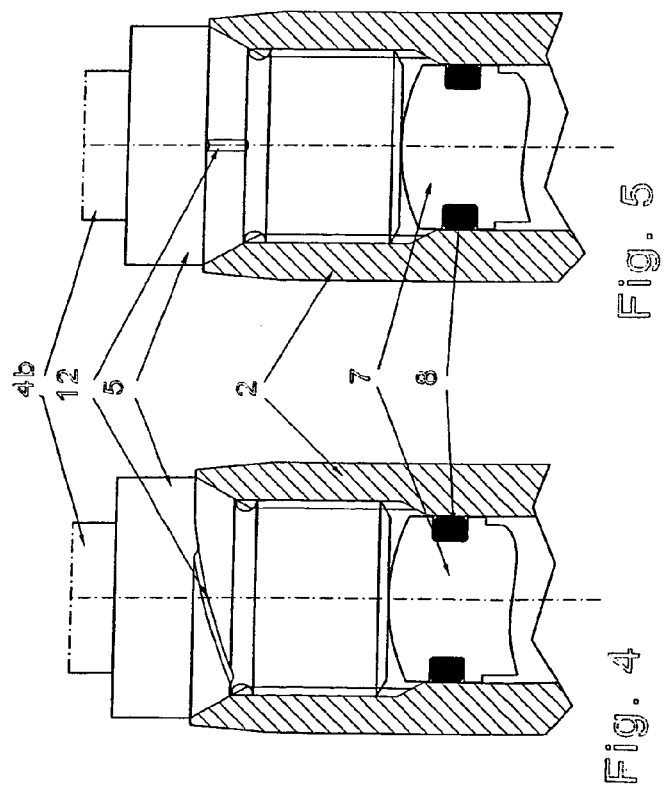

PISTON-CYLINDER UNIT

BACKGROUND OF THE INVENTION

1. Field of the Invention

The invention pertains to a piston-cylinder unit consisting of a working cylinder; a piston attached to a piston rod and installed with freedom of axial displacement in the working cylinder; and fastening elements, at least one of which is screwed into a threaded bore in the piston rod, where the interior pressure in the working cylinder holds a valve in the bore of the piston rod against an end surface of the fastening element, and where a vent bore leading to the atmosphere is provided between the end surface and the valve to create a pressure gradient to the working space.

2. Description of the Related Art

U.S. Pat. No. 6,223,649 discloses a piston-cylinder unit in which an axially movable piston is provided in the working cylinder, where at least one of the fastening elements is screwed into a threaded bore in the piston rod and holds a valve of a pump rod complex in place in the axial direction, as shown in FIG. 5.

Self-pumping hydropneumatic spring strut units with internal level control are also known (e.g., DE 33 16 069 C2), in which a control sleeve and a snap ring are used to install a valve of a pump-rod complex in the hollow space inside the piston rod, and in which a stopper, which is a component of a fastening element, is used to hold the valve in its axial position in one direction. This pressure valve is held in its axial position in the other direction by the positive pressure in the working space, because this positive pressure is always able to act through a channel on a part of the valve body. A vent bore, which guarantees that the internal pressure is always greater than the atmospheric pressure prevailing behind the valve, is provided for this purpose between the valve body and the stopper. So that this pressure gradient can always be maintained, there must a connection to the atmosphere via the vent bore, which must be located behind the seal. The need to introduce an axially oriented vent bore in the piston rod calls for complicated manufacturing operations.

SUMMARY OF THE INVENTION

The task of the invention is to create a piston-cylinder unit in which a simple and low-cost vent to the atmosphere can be created in the end area of the hollow piston rod, where, in addition, the manufacturing process can also be optimized.

To accomplish this task, at least one groove is provided between the inner surface of the piston rod and the fastening element to serve as the vent bore.

It is advantageous for the vent to be provided in the end area of the hollow piston rod or possibly in the fastening element.

According to an especially favorable embodiment, the groove is located either in the end area of the conical part of the bore of the piston rod or in the outer surface of the fastening element. The advantage here is that the groove can be made while the workpiece is still in the same clamping arrangement as that used for cutting the thread. It does not matter whether the groove is made in the end area of the hollow piston rod or in the end area of the fastening element. The ability to produce the groove in a single clamping of the workpiece makes it possible to shorten the production process, to reduce production costs, and to decrease the setup time. The tooling costs with respect to the clamping elements are also significantly lower.

According to a favorable embodiment, the groove is straight.

According to another essential feature, the groove proceeds at a slant along the inside circumference of the bore and/or along the outside circumference of the fastening element.

According to an embodiment which is very simple in terms of manufacturing, the groove is created by either a swarfless process or by a cutting/grinding process.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 4–7 show detailed views of individual variants of a groove.

DETAILED DESCRIPTION OF THE PRESENTLY PREFERRED EMBODIMENTS

Figures 1, 2:
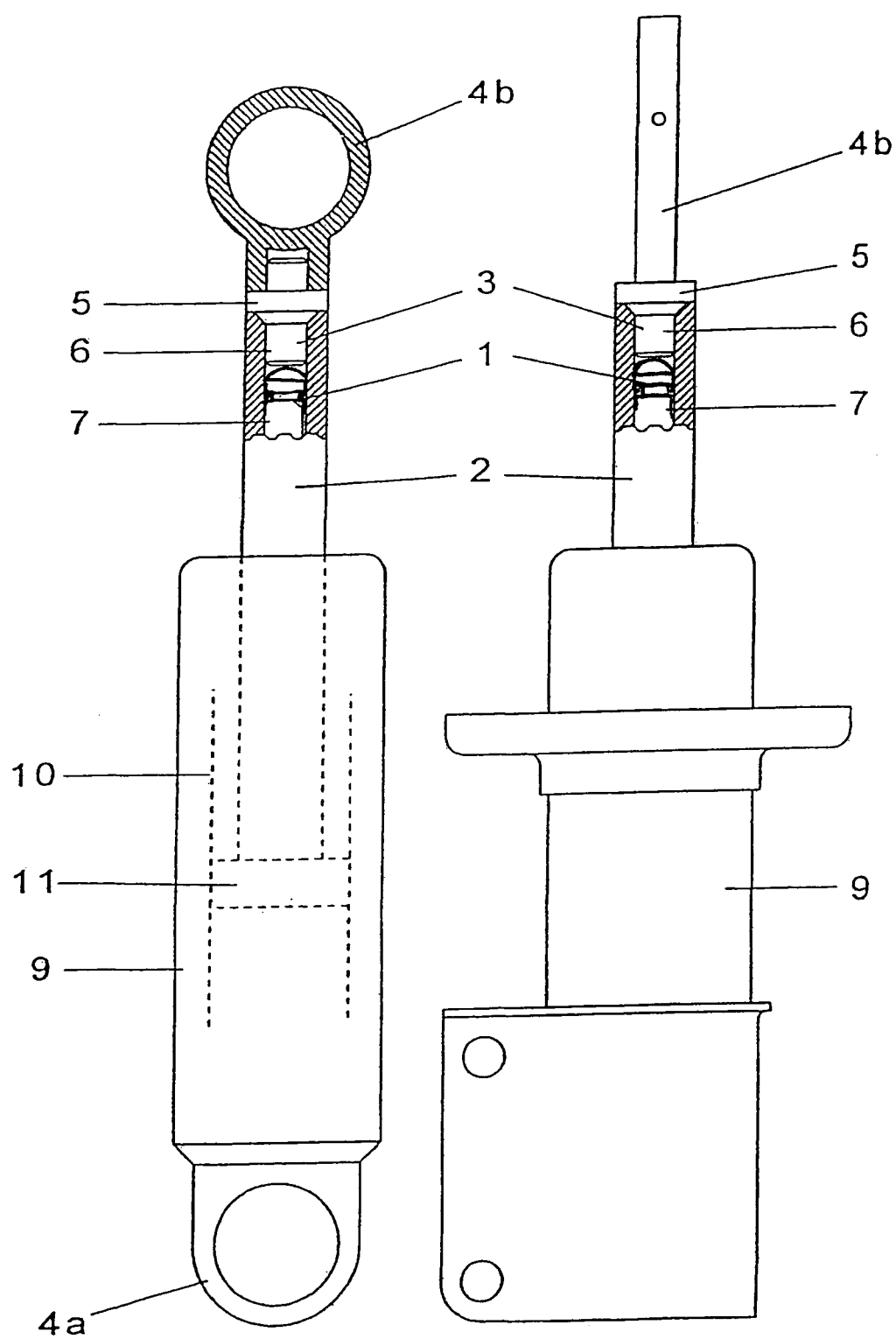
FIG. 1 shows a piston-cylinder unit in the form of an axle damper.
FIG. 2 shows a piston-cylinder unit in the form of a spring strut unit designed to carry a wheel.

The piston-cylinder unit shown in FIG. 1 consists essentially of the outer tube 9, in which the working cylinder 10 is installed. The piston 11 in the working cylinder 10 is attached to a piston rod 2 and is mounted together with the piston rod in such a way that it can move axially back and forth in the working cylinder 10. The fastening element 4a is connected directly to the outer tube 9, whereas fastening element 4b is connected to the piston rod 2 by way of a pin 6, provided with a thread 3. The shoulder 5 on the fastening element 4b has a surface which tapers down to the thread 3. The bore 1 in the piston rod 2, which is hollow, has an expanding surface, preferably a conical surface, with which the shoulder 5 engages. In the hollow space of the piston rod 2, there is a valve 7, which belongs to a pump-rod complex but is not described in further detail in this embodiment. The internal pressure in the working cylinder brings the valve 7 into contact with the pin 6, because there is a pressure gradient between the atmosphere and the internal pressure in the working cylinder.

FIG. 2 shows a spring strut unit, which also has an outer tube 9, where the piston rod 2, via the thread 3, carries the fastening element 4b. Tapering and expanding surfaces are provided in this embodiment as well. The connection is the same in principle as that illustrated in FIG. 1.

Figure 3:
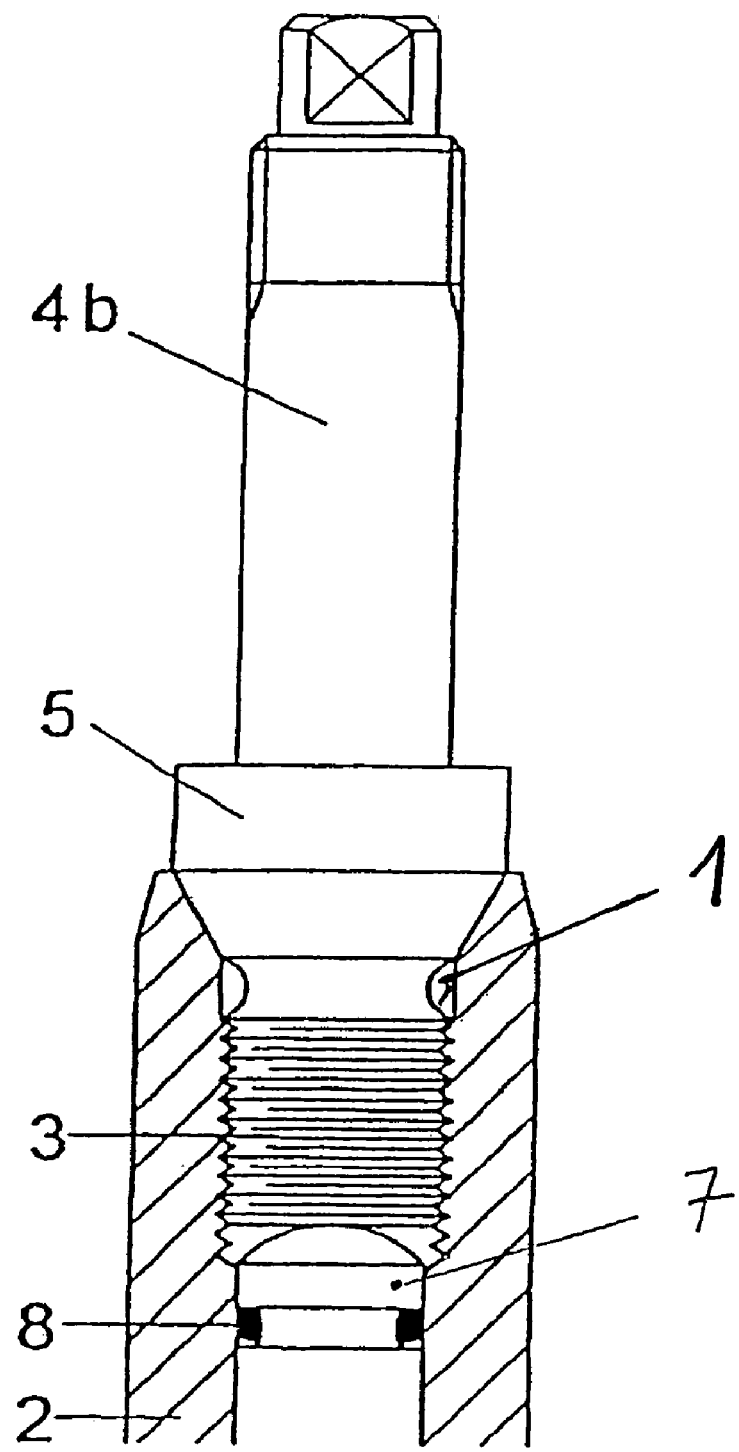
FIG. 3 shows a detailed view of an embodiment of a fastening element with a piston rod.

FIG. 3 shows a detailed view of the end area of the piston rod 2 and of the fastening element 4b. The shoulder 5 has a conical surface which tapers down to the thread 3, whereas the bore 1 expands in the end area so that the shoulder 5 comes to rest against the piston rod 2. To achieve a pressure-tight connection, a seal 8 is installed in the valve 7. Each of FIGS. 4–6 shows a valve body 7 in the hollow piston rod 2, where the end area of the pin 6 makes contact with the valve 7. The seal 8 seals off the interior space against the end area of the piston rod 2. To achieve satisfactory venting in the end area of the piston rod 2, a groove 12 is provided in the conical surface of the piston rod 2. This groove 12 ensures a pressure gradient, because the end area communicates with the atmosphere, whereas the interior space of the working cylinder is sealed off against this area by the seal 8. This means that the internal pressure will always press the valve against the pin 6.

According to FIGS. 4 and 5, the groove 12 is provided in the fastening element 4b, whereas the groove 12 in FIGS. 6 and 7 is provided into the expanding surface of the piston rod 2.

The groove 12 can be made in the component in question by a cutting/grinding process or by a suitable fabricating process which does not involving actual cutting/grinding.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston-cylinder unit comprising:
    a working cylinder having an internal pressure;
    a piston which is axially moveable in the working cylinder;
    a piston rod attached to the piston and having an end extending out of the cylinder, said piston rod having an inner surface defining a bore which is a threaded bore at said end;
    a fastening element screwed into the threaded bore, the fastening element having a radial outer surface and an axial end surface in the bore;
    a valve installed in said bore and held against the axial end surface by the internal pressure in the working cylinder; and
    a vent groove formed in the inner surface of the piston rod or in the radial outer surface of the fastening element creating an air duct extending between the inner surface of the piston rod and the radial outer surface of the fastening element and leading to an atmosphere outside the unit.

2. The piston-cylinder unit of claim 1 wherein the inner surface of the piston rod comprises a conical surface, and the radial outer surface of the fastening element comprises a conical surface, the conical surface of the piston rod receiving the conical surface of the fastening element, the groove being provided in the conical surface of the piston rod.

3. The piston-cylinder unit of claim 1 wherein the inner surface of the piston rod comprises a conical surface, and the radial outer surface of the fastening element comprises a conical surface, the conical surface of the piston rod receiving the conical surface of the fastening element, the groove being provided in the conical surface of the fastening element.

4. The piston-cylinder unit of claim 1 wherein the groove is straight and lies in a plane of the cylinder axis.

5. The piston-cylinder unit of claim 1 wherein the groove proceeds axially and circumferentially with respect to the axis of the cylinder.

6. The piston-cylinder unit of claim 1 wherein the groove is formed by a non-cutting process.

\* \* \* \* \*